United States Patent Office 2,704,341
Patented Mar. 15, 1955

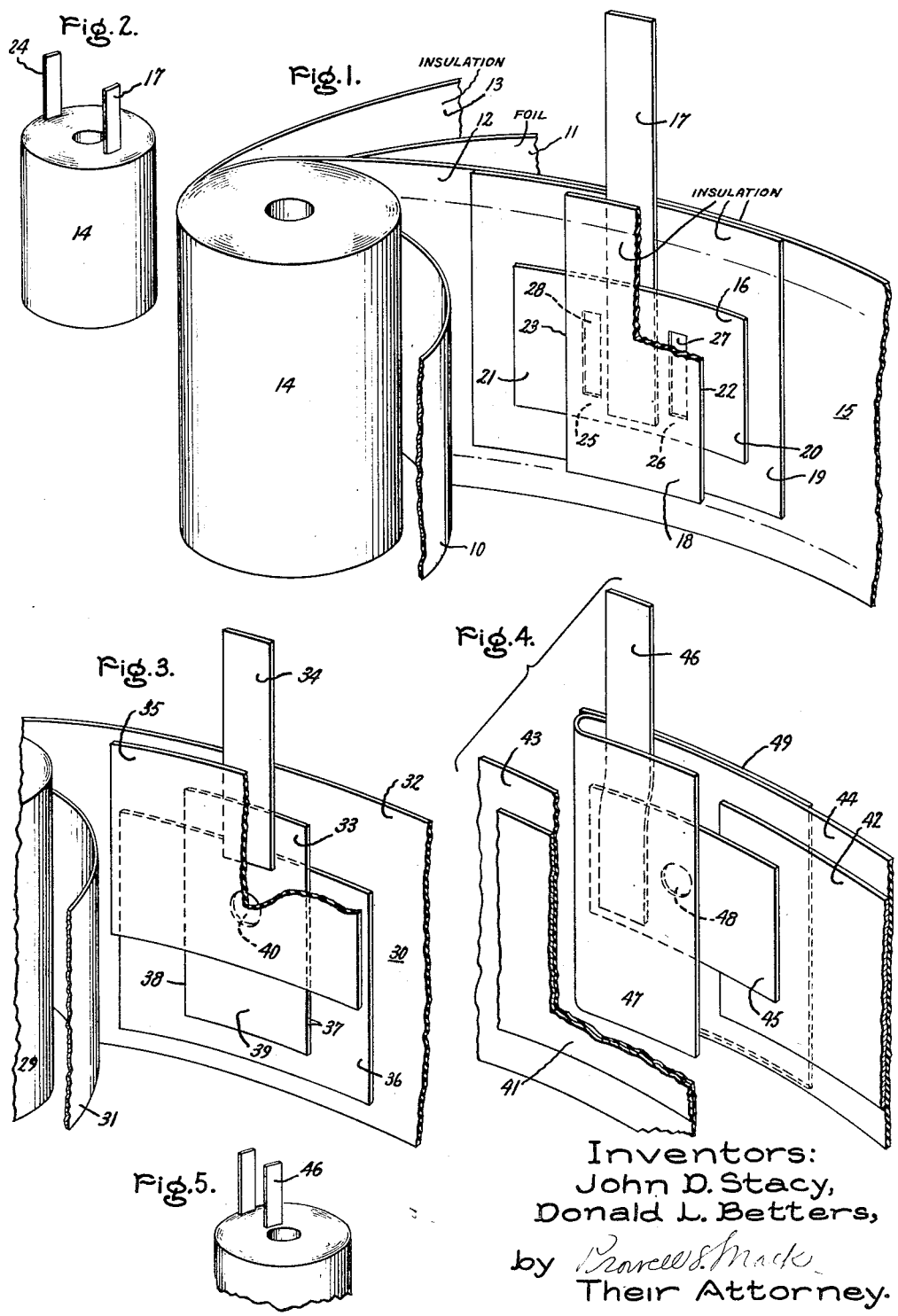

2,704,341

FUSED CAPACITORS

John D. Stacy, Fort Edward, and Donald L. Betters, Hudson Falls, N. Y., assignors to General Electric Company, a corporation of New York Application July 11, 1952, Serial No. 298,362

12 Claims. (Cl. 317—256)

This invention relates to electric capacitors or condensers and more particularly to a fused capacitor and a unitary fuse sub-assembly for convenient incorporation in capacitors.

Although electric condensers or capacitors have previously been provided with fuse protection to isolate one or more defective capacitor sections therein from other sections, the fuse or fuses have usually been positioned either outside the capacitor case or container or separated from the elements making up the capacitor section proper. In an isolated case known to applicants, one or more fusible elements have been assembled in close proximity to the capacitor sections but the element consisted of a fusible wire which tends upon blowing or rupturing to concentrate the energy released in the arc within a small area and the general arrangement otherwise was such that arc interruption was too prolonged, the arc tended to burn through dielectric material to adjacent metal electrodes of opposite polarity, the capacitor case tended to become distorted due to the pressures generated, and a considerable quantity of contaminating material was released within the capacitor enclosure. Otherwise, however, there would be a decided advantage in a fused capacitor having the fusible element or elements assembled in close proximity to the capacitor body or bodies proper provided these prior art disadvantages could be overcome.

It is therefore an object of this invention to provide a new and improved fused capacitor.

It is also an object of this invention to provide a fused capacitor in which the energy released in an arc upon rupture of a fusible element is distributed over a relatively large area and the arc rapidly interrupted with a minimum of distortion of the capacitor elements and container therefor.

It is a further object of this invention to provide a fused capacitor including means to prevent penetration or breakdown of the dielectric material therein by the arc resulting from rupture of the fusible element.

It is still a further object of this invention to provide a unitary fuse sub-assembly which can conveniently be assembled either manually or automatically by machine between the elements of a conventional rolled type capacitor during the winding or rolling operation.

The invention will be better understood from the following description when taken in connection with the accompanying drawing and the scope of the invention will be pointed out in the appended claims. In the drawing Fig. 1 is a perspective view of the body of a conventionally rolled capacitor partially unwound to better illustrate one embodiment of a fuse sub-assembly of the invention therein; Fig. 2 is a perspective view of a completely wound capacitor roll or body incorporating the Fig. 1 embodiment assembled therein and ready for installation in an enclosing case or container; Fig. 3 is a partial perspective view of a partially unwound capacitor roll illustrating another embodiment of the invention; Fig. 4 is a perspective view of a portion of a capacitor illustrating a third embodiment of the invention and Fig. 5 is a perspective view of a completely wound capacitor roll, similar to Fig. 1, and incorporating the Fig. 4 embodiment therein.

In Fig. 1 is illustrated a conventional rolled type capacitor unit or sub-section comprising a pair of electrodes or longitudinal strips of foil conducting material 10 and 11 and a pair of longitudinal strips 12 and 13 of insulating or dielectric material alternately disposed and wound into a compact roll 14. Each alternate strip of dielectric which may be a single but is usually a laminated strip built up of several sheets of impregnated dielectric material, has a greater width than the strips of conducting material and projects a sufficient distance beyond the longitudinal edges thereof so as to prevent short circuiting between alternately disposed conducting foils of opposite polarity. The description thus far applies to many rolled type prior art capacitors and the arrangement generally speaking also applies to conventional capacitors employing spaced rigid electrodes or plates of conducting material with either a solid or liquid dielectric therebetween.

However, in accordance with this invention the capacitor unit or section is provided with a fuse sub-assembly 15 disposed approximately near the developed center of the roll between one of the conducting electrodes or foil 10 and the strip of dielectric material 12 adjacent thereto. The sub-assembly 15 comprises a fusible element 16 consisting of a rectangularly shaped foil of metal conducting material, having a thickness varying as required from approximately .002 inch to about .00015 inch and of a relatively low melting point compared to that of the foils 10 or 11, a lead-in tap or terminal tap strap 17 of conducting material cemented or otherwise suitably maintained in electric contact engagement with a central portion of fusible element 16 and extending transversely to the longitudinal strips of dielectric material 12 and 13 beyond the upper longitudinal edges thereof, a rectangularly shaped pad or strip 18 of heavy paper or other suitable electrical insulating material centrally positioned with respect and cemented to fusible element 16 and a backup strip of heavy paper or other suitable electric insulating material 19 cemented or otherwise fixed to tap strap 17 or to fusible element 16. As illustrated, insulating pad 18 covers a central portion of one face or side of fusible element 16 and extends transversely with respect to strips 12 and 13 to the upper longitudinally extending edges thereof or sufficiently beyond the upper longitudinally extending edge, relatively shown by the broken line, of conducting foil 10 so as to respectively insulate the entire central portion of fusible element 16 and the portion of tap strap 17 within the roll 14 from conducting foil or electrode 10. On the other hand, portions 20 and 21 of fusible element 16 extend in a direction longitudinally with respect to strips 12 and 13 respectively beyond opposite transversely extending edges 22 and 23 of pad 18 so as to be physically and electrically engageable with conducting foil 10 when the capacitor unit is completely rolled as shown in Fig. 2. The upper or projecting end of terminal tap strap 17 may be electrically connected in a manner well known in the art either to the conductor, not shown, of a bushing terminal mounted on the cover or wall of a capacitor enclosing casing or to a similar tap strap of another capacitor roll or unit while another tap strap 24, shown only in Fig. 2 and without a fusible element connected thereto, is disposed in the roll in electric contact engagement with conducting foil 11 in the usual and well known manner. The projecting end of tap strap 24 may likewise be connected to the conductor of a bushing or to the tap strap of another capacitor roll. Thus, intermediate tap strap 17 and foil contacting portions 20 and 21 respectively, portions 25 and 26 of fusible element 16 readily subject to fusing or rupture are connected electrically in series between the tap strap 17 and foil 10 so that upon the occurrence of a defect or fault in the capacitor roll, either one or both of these portions 25 and 26 will rupture or blow, causing the capacitor roll to be isolated from the balance of the circuit to which it is connected. Since the backup insulating strip 19 extends beyond all the edges of fusible element 16, it will be apparent that it serves to prevent the arc caused by fusing from burning through the dielectric strip 12. In order to give variations in current rating, the fusible element 16 may be provided with some width restricting means such as edge notches or an aperture at either or both of the portions 25 and 26. As an example, fusible element 16 has been provided with rectangularly shaped apertures or openings 27 and 28 although it should be understood that such openings may be circular or any other shape.

Like the Fig. 1 embodiment, a capacitor roll 29, similar to the roll 14, is provided in the Fig. 3 embodiment with a fuse sub-assembly 30 also disposed near the developed center of the roll 29 between a longitudinal foil strip or electrode 31 of conducting material and a longitudinal strip of dielectric material 32 adjacent thereto. Also like the sub-assembly 15 of the Fig. 1 embodiment, sub-assembly 30 comprises a rectangularly shaped fusible element 33 of conducting material having a relatively low melting point compared to that of electrode 31, a lead-in terminal or tap strap 34 suitably fixed in electric contact engagement with a portion of fusible element 33 and extending transversely with respect to the longitudinally extending strip of dielectric material 32 beyond the upper longitudinal edge thereof, a rectangularly shaped pad 35 of relatively heavy insulating material cemented to fusible element 33 and a backup strip 36 of insulating material cemented or otherwise fixed to the back surface of fusible element 33. However, in contrast to the Fig. 1 embodiment insulating pad 35 extends longitudinally with respect to conducting strip 31 and dielectric strip 32 beyond a pair of opposite and transversely extending edges 37 and 38 of fusible element 33 and otherwise extends transversely so as to insulate a portion of the fusible element and the portion of tap strap 34 within the roll from conducting foil 31. Thus a single portion 39 of fusible element 33 extending beyond the lower longitudinally extending edge of pad 35 and spaced from the portion of the fusible element engaged by the tap strap 34 is presented for electric contact engagement with electrode 31 when the roll 29 has been completely wound. To better control the current rating of the fusible element, an aperture 40 may be provided in the portion intermediate the tap strap and the foil contacting portion 39 as illustrated. To prevent an arc, upon the occurrence of a fault from burning through dielectric strip 32, backup strip 36 overlaps the portion of pad 35 which covers sheet 33 between the portion 39 thereof and the portion engaged by tap strap 34. In addition, however, it should be noted that the oppositely disposed edges of pad 35 and backup strip 36 extending transversely with respect to the dielectric strip 32 are aligned or superposed. This latter feature readily adapts the fuse sub-assembly of the Fig. 3 embodiment to automatic insertion between foil 31 and dielectric strip 32 by mechanical means in the manner that a tap strap is automatically inserted in a capacitor roll as disclosed in the Hogue et al. Patent 2,547,644, issued April 3, 1951, and assigned to the same assignee as the instant application. To be more specific, a plurality of fusible elements 33 each with a tap strap 34 suitably affixed thereto may be preassembled in spaced relationship between and cemented to a pair of longitudinally extending strips of insulating material corresponding to pad 35 and backup strip 36 after which the assembly may be wound up into a roll suitable for mounting on a spindle of a capacitor winding machine. As disclosed in the above-mentioned patent, the pair of strips with the fusible elements and tap straps therebetween may then be automatically fed under a knife and transversely severed intermediate the spaced fusible element-tap strap combination to define fuse sub-assemblies 30 with the transversely extending and aligned edges of pad 35 and backup strip 36 representing the edges presented after severing.

In Fig. 4 we have illustrated the end portion of a rolled type capacitor, comprising a pair of electrodes or longitudinal strips of conducting material 41 and 42 and a pair of longitudinally extending strips 43 and 44 of dielectric material alternately disposed as in the Figs. 1 and 3 embodiments. Conducting foil 42 has been cut shorter than foil 41 and as a modification of the invention the unit has been provided with a fuse comprising a rectangularly shaped foil of metal conducting material 45 having a relatively low melting point affixed to an end portion of conducting strip 42 so as to be in electric contact engagement therewith. A tap strap 46 of conducting material affixed in electric contact engagement in any suitable manner with a portion of foil 45 spaced from the portion engaging conducting strip 42 extends transversely beyond the upper longitudinally extending edge of dielectric strip 44. To serve as a backup strip and thereby prevent burning through of dielectric strip 43, an end portion of dielectric strip 44 has been folded in a U-shaped turn around the tap strap and the free end of fusible element 45 so as to present an additional strip 47 of insulating material disposed between dielectric strip 43 and the portion of the fusible element 45 intermediate the tap strap 46 and conducting electrode 42. As in the case of the other embodiments this intermediate portion of fusible element 44 may be provided with an aperture 48 as shown. Depending upon the expected voltage conditions, a relatively heavy strip or pad 49 of insulating material may be disposed as illustrated adjacent dielectric strip 44 to prevent an arc, upon fusing of element 45, from burning through strip 44 and causing a short circuit between tap 46 or foil 42 and electrode foil 41 which otherwise, of course, will be adjacent dielectric strip 44 after winding into a roll as illustrated in Fig. 5.

While we have, in accordance with the patent statutes, shown and described a particular embodiment of our invention and modifications thereof, it will be obvious that changes and modifications can be made without departing from the invention in its broader aspects and we, therefore, aim in the appended claims to cover all such changes and modifications as fall within the true spirit and scope of the invention.

What we claim as new and desire to secure by Letters Patent of the United States is:

1. In an electric capacitor comprising a plurality of longitudinal strips of conducting material and dielectric material alternately disposed and wound into a roll, a fuse sub-assembly disposed between one of said longitudinal strips of dielectric material and a longitudinal strip of conducting material adjacent thereto comprising a fusible foil element arranged between the longitudinal edges of said one strip of dielectric material and having a portion thereof electrically connected to said adjacent strip of conducting material, means for electrically insulating the remaining portion of said fusible element from said longitudinal strips of conducting material, and a tap strap of conducting material extending transversely to said longitudinal strips of dielectric material beyond the longitudinal edges thereof, said tap strap being in contacting engagement with said fusible element and spaced from said portion thereof electrically connected to said adacent strip of conducting material.

2. In an electric capacitor having a plurality of alternately arranged longitudinal strips of dielectric and conducting material wound into a compact roll, a fuse comprising a foil of metal conducting material having a relatively low melting point and arranged between the opposite longitudinal edges of said strips of dielectric material with a portion thereof in physical engagement with one of said strips of conducting material, means for electrically insulating the remaining portion of said fuse from said longitudinal strips of conducting material, and a lead-in tap of conducting material extending transversely to said longitudinal strips of dielectric material beyond one of the longitudinal edges thereof, said tap being in physical engagement with said fuse at a portion thereof spaced from said portion in engagement with said one strip of conducting material.

3. In an electric capacitor having a plurality of alternately arranged longitudinal strips of dielectric and conducting material, a fuse sub-assembly disposed between one of said longitudinal strips of dielectric material and a longitudinal strip of conducting material adjacent thereto comprising a fusible foil element having opposite faces and disposed between said adjacent strips of dielectric and conducting material and lying within the opposite longitudinal edges thereof, said fusible foil element having a portion thereof on one face in electrical contact engagement with said adjacent strip of conducting material, a lead-in tap of conducting material extending transversely to said longitudinal strips beyond one of the longitudinal edges of said strips of dielectric material and in electrical contact engagement with a portion of said fusible element spaced from said portion in engagement with said adjacent strip of conducting material, an insulating strip arranged in contact with the remaining portion of said fusible foil element on said one face thereof, and a backup strip of insulating material positioned between said fusible element and said one longitudinal strip of dielectric material.

4. In an electric capacitor having a plurality of alternately arranged longitudinal strips of dielectric and conducting material, a fuse sub-assembly disposed between one of said longitudinal strips of conducting material and a longitudinal strip of dielectric material adjacent thereto comprising a pad of insulating material positioned adjacent said one strip of conducting material, a rectangularly shaped foil of metal conducting material having a relatively low melting point centrally positioned with respect to said pad adjacent the face thereof opposite the face adjacent said one strip of conducting material, a lead-in tap of conducting material extending transversely to said longitudinal strips beyond one of the longitudinal edges of said strips of dielectric material and in electrical contact engagement with a central portion of said rectangularly shaped metallic foil, said foil having portions extending in a direction longitudinally with respect to said strips beyond opposite edges of said pad and engageable with said one strip of conducting material, said pad extending in a direction transversely with respect to said strips beyond a pair of opposite edges of said foil to insulate a central portion thereof and said lead-in tap from said one strip of conducting material, and a backup pad of insulating material positioned intermediate said foil and said adjacent longitudinal strip of dielectric material and extending beyond all the edges of said foil.

5. In an electric capacitor having a plurality of alternately arranged longitudinal strips of dielectric and conducting material, a fuse sub-assembly disposed between one of said longitudinal strips of conducting material and a longitudinal strip of dielectric material adjacent thereto comprising a pad of insulating material positioned with a side thereof adjacent said one strip of conducting material, a foil of metal conducting material having a relatively low melting point positioned with respect to said pad adjacent the face thereof opposite the face adjacent said one strip of conducting material, a lead-in tap of conducting material extending transversely to said longitudinal strips beyond one of the longitudinal edges of said strips of dielectric material and in electrical contact engagement with a portion of said metallic foil, said pad extending in direction transversely and longitudinally with respect to said strips beyond edges of said foil and insulating a portion thereof and said lead-in tap from said one strip of conducting material, said foil having a portion spaced from the portion thereof engaged by said lead-in tap extending in a direction transversely with respect to said strips beyond an edge of said pad and engageable with said one strip of conducting material, and a backup strip of insulating material positioned intermediate said foil and said adjacent longitudinal strip of dielectric material, said backup strip overlapping the portion of said pad between the portion of said foil engageable with said one strip of conducting material and said lead-in tap.

6. In an electric capacitor having a plurality of alternately arranged longitudinal strips of dielectric and conducting material, a fuse sub-assembly disposed between one of said longitudinal strips of conducting material and a longitudinal strip of dielectric material adjacent thereto comprising a foil of metal conducting material having a relatively low melting point, a lead-in tap of conducting material extending transversely to said longitudinal strips beyond one of the longitudinal edges of said strips of dielectric material and in electric contact engagement with a portion of said metallic foil, a pad of insulating material positioned between said one longitudinal strip of conducting material and said metallic foil and insulating portions thereof and said lead-in tap from said one strip of conducting material, said metallic foil having a portion spaced from the portion engaged by said lead-in tap extending beyond an edge of said insulating pad engageable with said one strip of conducting material and a backup pad of insulating material positioned intermediate said metallic foil and said adjacent longitudinal strip of dielectric material.

7. In an electric capacitor having a plurality of alternately arranged longitudinal strips of dielectric and conducting material, a fuse sub-assembly disposed between one of said longitudinal strips of conducting material and a longitudinal strip of dielectric material adjacent thereto comprising a pad of insulating material positioned adjacent said one strip of conducting material, a foil of metal conducting material having a relatively low melting point compared to said strips of conducting material positioned with respect to said pad adjacent the face thereof opposite the face adjacent said one strip of conducting material, a lead-in tap of conducting material extending transversely to said longitudinal strips beyond one of the longitudinal edges of said strips of dielectric material and in electric contact engagement with a central portion of said metallic foil, said pad extending in a direction transversely with respect to said strips beyond a pair of opposite edges of said foil and insulating an intermediate portion thereof and said lead-in tap from said one strip of conducting material, said foil extending in a direction longitudinally with respect to said strips beyond said intermediate portion and defining portion engageable with said one strip of conducting material, and a backup pad of insulating material positioned intermediate said foil and said one longitudinal strip of dielectric material and extending beyond all the edges of said foil.

8. A fuse sub-assembly for a capacitor comprising a sheet of conducting material having a relatively low melting point, a tap strap of conducting material having a portion of one side thereof in electrical contact engagement with a portion of said sheet and extending a predetermined distance transversely beyond an edge thereof, a pad of insulating material adhesively affixed to said sheet and extending beyond edges thereof so as to cover a portion of one side of said tap strap and a portion of the corresponding side of said sheet, said side of said sheet having a portion spaced from said portion thereof engaged by said tap strap extending beyond an edge of said pad of insulating material and a backup strip of insulating material adhesively affixed to the opposite side of said sheet of conducting material and overlapping the portion of said pad covering said sheet between the portion thereof extending beyond said edge of said pad and the portion engaged by said tap strap.

9. A fuse sub-assembly for a capacitor comprising a sheet of conducting material having a relatively low melting point, a tap strap of conducting material having a portion of one side thereof in electrical contact engagement with a portion of said sheet and extending a predetermined distance transversely beyond an edge thereof, a pad of insulating material adhesively affixed to said sheet and extending beyond edges thereof so as to cover a portion of one side of said tap strap and a portion of the corresponding side of said sheet, said side of said sheet having a portion spaced from said portion thereof engaged by said tap strap extending beyond an edge of said pad of insulating material and a backup strip of insulating material adhesively affixed to the opposite side of said sheet of conducting material and overlapping the portion of said pad covering said sheet between the portion thereof extending beyond said edge of said pad and the portion engaged by said tap strap, said sheet of conducting material having an aperture therein intermediate said portion engaged by said tap strap and said portion extending beyond an edge of said pad.

10. A fuse sub-assembly for a capacitor comprising a rectangularly shaped sheet of conducting material having a relatively low melting point, a tap strap of conducting material having a portion of one side thereof in electrical contact engagement with a portion of said sheet and extending a predetermined distance transversely beyond an edge thereof, a rectangularly shaped pad of insulating material adhesively affixed to said rectangularly shaped sheet and extending beyond said edge thereof and the edge opposite thereto so as to cover a portion of one side of said tap strap and a portion of the corresponding side of said sheet, said sheet having portions spaced from said portion thereof engaged by said tap strap extending respectively beyond a pair of opposite edges of said pad of insulating material and a backup strip of insulating material adhesively affixed to the side of said tap strap opposite to said side in contact engagement with said sheet and extending beyond all the edges of said sheet, said tap strap extending beyond edges of said pad and said backup strip.

11. A fuse sub-assembly for a capacitor comprising a sheet of conducting material having a relatively low melting point, a tap strap of conducting material having a portion of one side thereof in electrical contact engagement with a portion of said sheet and extending a predetermined distance beyond an edge thereof, a rectangularly shaped pad of insulating material adhesively affixed to said sheet and extending beyond edges thereof so as to cover a portion of one side of said tap strap and a portion of the corresponding side of said sheet, said pad so positioned that said tap strap extends transversely beyond an adjacent edge thereof and so that a pair of opposite edges of said pad extending normally to said adjacent edge are respectively positioned beyond and spaced from opposite edge portions of said sheet, said sheet having a portion spaced from said portion thereof engaged by said tap strap extending beyond the edge of said pad opposite said edge adjacent to said tap strap, a rectangularly shaped backup strip of insulating material adhesively affixed to the opposite side of said sheet and overlapping the portion of said pad covering said sheet between said portion thereof extending beyond said edge and the portion engaged by said tap strap with a pair of opposite edges of said backup strip aligned with said opposite edges of said pad.

12. In an electric capacitor having a plurality of alternately arranged longitudinal strips of dielectric and conducting material, a fusible element having a portion thereof in physical engagement with an end portion of one of said strips of conducting material, said fusible element extending longitudinally with respect to said one strip of conducting material beyond the terminating edge of said end portion, a lead-in tap of conducting material in physical engagement with a portion of said fusible element spaced from the portion thereof in engagement with said one strip and extending transversely with respect to said longitudinal strips of dielectric material beyond one of the longitudinal edges thereof, and a strip of insulating material disposed between one of said strips of dielectric material adjacent to said one strip of conducting material and the portion of said fusible element between the portion thereof engaged with said one strip of conducting material and said tap strap, said strip of insulating material being defined by an end portion of another of said strips of dielectric material adjacent said one strip of conducting material folded in a U-shaped turn around said tap strap and the end of said fusible element remote from said one strip of conducting material.

References Cited in the file of this patent

UNITED STATES PATENTS

| | | |
|---|---|---|
| 1,255,597 | Giles | Feb. 5, 1918 |
| 1,823,328 | Marbury | Sept. 15, 1931 |
| 1,823,368 | Marbury | Sept. 15, 1931 |
| 1,847,875 | Hollnagel | Mar. 1, 1932 |
| 2,547,644 | Hogue | Apr. 3, 1951 |